(12) United States Patent
Watters

(10) Patent No.: US 9,644,450 B2
(45) Date of Patent: May 9, 2017

(54) WELL FLOW CONTROL ASSEMBLIES AND ASSOCIATED METHODS

(71) Applicant: Halliburton Energy Services, Inc., Houston, TX (US)

(72) Inventor: Travis David Watters, Flower Mound, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/026,384

(22) PCT Filed: Dec. 4, 2015

(86) PCT No.: PCT/US2015/064043
§ 371 (c)(1),
(2) Date: Mar. 31, 2016

(87) PCT Pub. No.: WO2016/122774
PCT Pub. Date: Aug. 4, 2016

(65) Prior Publication Data
US 2016/0356120 A1 Dec. 8, 2016

Related U.S. Application Data

(60) Provisional application No. 62/107,870, filed on Jan. 26, 2015.

(51) Int. Cl.
*F16K 17/16* (2006.01)
*E21B 34/02* (2006.01)
(Continued)

(52) U.S. Cl.
CPC .............. *E21B 34/02* (2013.01); *E21B 43/12* (2013.01); *F16K 1/126* (2013.01); *F16K 17/403* (2013.01);
(Continued)

(58) Field of Classification Search
CPC ......... Y10T 137/7734; Y10T 137/1692; Y10T 137/1714; Y10T 137/0491;
(Continued)

(56) References Cited

U.S. PATENT DOCUMENTS 1,279,898 A * 9/1918 Nixon ..................... F16K 13/04
137/68.19
3,051,246 A 8/1962 Clark, Jr. et al.
(Continued)

FOREIGN PATENT DOCUMENTS

CA 1170984 7/1984
EP 0060842 9/1982
(Continued)

OTHER PUBLICATIONS

"International Application Serial No. PCT/US2015/064043, International Search Report mailed Mar. 14, 2016", 5 pgs.
(Continued)

*Primary Examiner* — Jessica Cahill
(74) *Attorney, Agent, or Firm* — Chamberlain Hrdlicka

(57) ABSTRACT

A well choke, and an actuation mechanism for the well choke are described. The actuation mechanism includes a linearly translating drive mechanism which is coupled to a valve member drive assembly through a fluid coupling which facilitates a change in the overall length of the actuation mechanism. Fluid in the fluid coupling can be released in response to fluid pressure exerted on the valve member when it is proximate a valve seat of the choke, to achieve this change in length. In some embodiments, the fluid coupling will provide a retained fluid column and the valve member drive assembly will include a piston with in the fluid coupling which is movable from a fully extended to
(Continued)

a compressed, by the release of fluid from the coupling in response to pressure in the chamber reaching a threshold level.

20 Claims, 6 Drawing Sheets

(51) Int. Cl.
*E21B 43/12* (2006.01)
*F16K 1/12* (2006.01)
*F16K 17/40* (2006.01)
*F16K 31/122* (2006.01)
*F16K 31/163* (2006.01)

(52) U.S. Cl.
CPC ........ *F16K 31/1225* (2013.01); *F16K 31/163* (2013.01); *Y10T 137/0491* (2015.04); *Y10T 137/1692* (2015.04)

(58) Field of Classification Search
CPC ......... Y10T 137/6065; Y10T 137/6069; Y10T 137/2278; E21B 34/02; E21B 43/12; F16K 1/126; F16K 17/403; F16K 31/1225; F16K 31/163
USPC .......................................... 251/57, 264, 274
See application file for complete search history.

(56) References Cited

U.S. PATENT DOCUMENTS

| | | | |
|---|---|---|---|
| 3,776,250 A | 12/1973 | Knox | |
| 4,303,197 A | 12/1981 | Sandau | |
| 4,518,148 A | 5/1985 | Renfro | |
| 4,569,370 A | 2/1986 | Witt | |
| 4,683,955 A | 8/1987 | Stepp et al. | |
| 4,934,652 A * | 6/1990 | Golden | E21B 34/02 251/327 |
| 4,955,949 A | 9/1990 | Bailey et al. | |
| 5,197,718 A * | 3/1993 | Wallis | F16F 9/0218 137/68.23 |
| 5,320,181 A | 6/1994 | Lantier, Sr. et al. | |
| 5,411,049 A | 5/1995 | Colvard | |
| 5,913,504 A | 6/1999 | Nishimura et al. | |
| 5,992,520 A | 11/1999 | Schultz et al. | |
| 6,035,880 A | 3/2000 | Gazda | |
| 6,102,828 A * | 8/2000 | MacKenzie | E21B 33/0355 475/263 |
| 6,604,541 B1 * | 8/2003 | Denning | F16K 17/162 137/492.5 |
| 6,883,614 B2 | 4/2005 | Schmidt et al. | |
| 7,124,770 B2 | 10/2006 | Schmidt et al. | |
| 7,159,604 B2 | 1/2007 | Schmidt et al. | |
| 7,231,932 B2 | 6/2007 | Schmidt et al. | |
| 7,926,593 B2 | 4/2011 | Bailey et al. | |
| 8,347,982 B2 | 1/2013 | Hannegan et al. | |
| 8,402,996 B2 | 3/2013 | Piwonka | |
| 2003/0160197 A1* | 8/2003 | Kodama | F16K 31/408 251/57 |
| 2005/0139796 A1 | 6/2005 | Altonji | |
| 2006/0043683 A1 | 3/2006 | Ocalan | |
| 2007/0295925 A1 | 12/2007 | Spiegl et al. | |
| 2009/0294712 A1 | 12/2009 | Hutchings et al. | |
| 2010/0175867 A1* | 7/2010 | Wright | E21B 41/00 166/57 |
| 2011/0266478 A1 | 11/2011 | Piwonka | |
| 2012/0279603 A1 | 11/2012 | Swist | |
| 2012/0312548 A1 | 12/2012 | Swist | |
| 2013/0213492 A1* | 8/2013 | Newman | F16K 17/40 137/68.23 |
| 2013/0233549 A1 | 9/2013 | Boswell et al. | |

FOREIGN PATENT DOCUMENTS

| | | |
|---|---|---|
| EP | 2216503 A1 | 8/2010 |
| WO | 8201233 A1 | 4/1982 |
| WO | 2012064389 A1 | 5/2012 |

OTHER PUBLICATIONS

"International Application Serial No. PCT/US2015/064043, Written Opinion mailed Mar. 14, 2016", 6 pgs.

* cited by examiner

WELL FLOW CONTROL ASSEMBLIES AND ASSOCIATED METHODS

PRIORITY APPLICATION

This application is a U.S. National Stage Filing under 35 U.S.C. 371 from International Application No. PCT/US2015/064043, filed Dec. 4, 2015, which claims the benefit of priority to U.S. Provisional Application Ser. No. 62/107,870, filed on Jan. 26, 2015 which applications are incorporated by reference herein in its entirety.

The present application relates generally to flow control assemblies for controlling flows from a subterranean well, such as devices known as well chokes; and more particularly relates such flow control assemblies for installation proximate the Earth's surface having a safety release mechanism.

BACKGROUND

The use of flow control assemblies, such as well chokes for controlling fluid flows from a well are known in the industry. In some conventional flow control systems, a safety mechanism to allow opening of the well choke has been provided, typically through shear pins or similar frangible couplings between two or more members. The present disclosure addresses alternatives to such structures which are believed to offer substantial benefits over previously known structures and the assembly and use thereof.

BRIEF DESCRIPTION OF THE DRAWINGS

Various embodiments are illustrated by way of example in the following figures, in which.

DETAILED DESCRIPTION

The following description describes a well choke, and an actuation mechanism for the well choke. In certain embodiments, the actuation mechanism includes a linearly translating drive mechanism, which in some embodiments may be in the form of a screw mechanism, which is coupled to a valve member drive assembly through a fluid coupling which facilitates a change in the overall length of the actuation mechanism. In selected embodiments, this change in length will be in response to fluid pressure exerted on the valve member when it is proximate a valve seat of the choke. In some embodiments, the fluid coupling will provide a retained fluid column and the valve member drive assembly will include a piston with in the fluid coupling which is movable from a fully extended position within the fluid coupling (the standard operating mode), to a compressed position within the fluid coupling (in an actuated, pressure-relieving mode). In many embodiments, the retained fluid column may be released from the fluid coupling in response to a pressure responsive valve actuating when the pressure within the fluid chamber reaches a threshold level, Many other aspects and alternatives of the novel subject matter will be addressed in the following discussion.

The Example embodiments of the disclosed systems with reference to the accompanying drawings, which depict various details of examples that show how the systems may be practiced. The description addresses various examples of novel methods, systems and apparatus in reference to these drawings, and describes the depicted embodiments in sufficient detail to enable those skilled in the art to practice the disclosed subject matter. Many embodiments other than the illustrative examples discussed herein may be used to practice these techniques. Structural and operational changes in addition to the alternative specifically discussed herein may be made without departing from the departing scope of this disclosure.

In this description, references to "one embodiment" or "an embodiment," or to "one example" or "an example" in this description are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, as well as all legal equivalents of such claims.

Figure 1:
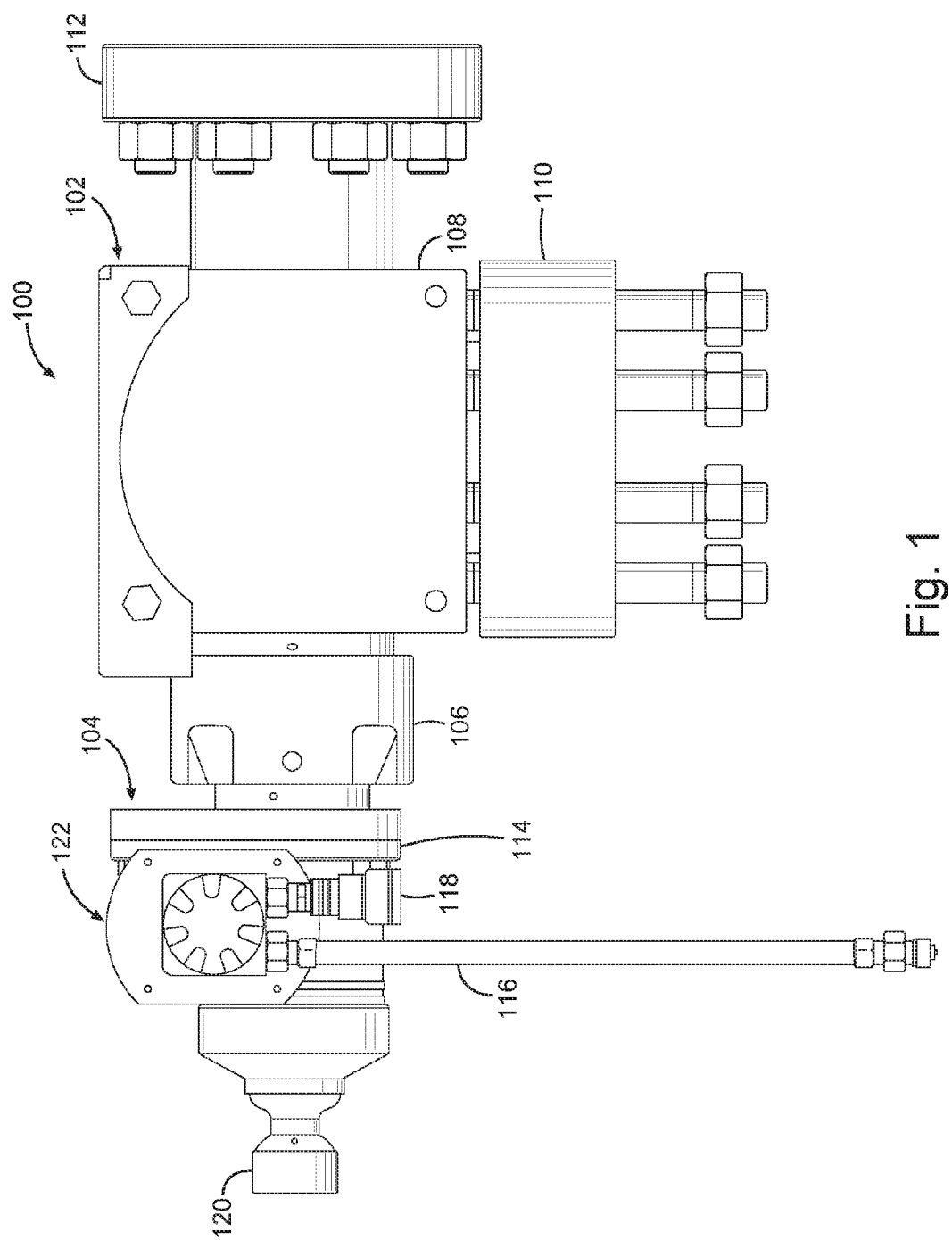
FIG. 1 is an external depiction, from a side view of a well flow control assembly, here in the form of a well choke, of an example configuration that can benefit from the methods and apparatus described herein.

Referring now to FIG. 1, that figure is a side view of an example well choke assembly 100 of a type which may benefit from the novel methods and apparatus discussed herein. Well choke assembly 100 includes two primary components, a valve assembly, indicated generally at 102, which houses the valve seat and the valve member of the well choke assembly 100 (discussed in reference to the following figures); and a choke actuator assembly, indicated generally at 104. Choke actuator assembly 104 facilitates movement of an actuation assembly, which terminates at a distal end in the valve member within valve assembly 102 to facilitate the desired flow control.

Valve assembly 102 includes a housing assembly 108, which further includes a first fluid coupling 110 configured to facilitate attachment to a conduit, such as a conventional tubular conduit extending to or from a well. Housing assembly 108 also includes a second fluid coupling 112, again configured to facilitate attachment to a conduit, wherein valve assembly 102 controls fluid flow between the conduits attached to fluid coupling 110 and fluid coupling 112.

Choke actuator assembly 104 operates to cause movement of a valve actuation assembly (discussed in reference to the remaining figures) by any of a number of mechanisms known to persons skilled in the art. Choke actuator assembly includes a housing assembly 114, housing the valve actuation assembly. In many embodiments, choke actuator assembly 104 will be configured for remote actuation, and potentially automatic actuation through hydraulic power, and therefore includes hydraulic conduits 116 and 118 to facilitate supply of appropriate hydraulic power to a hydraulic motor, indicated generally at 122, within choke actuator assembly 104. In other examples, choke actuator assembly 104 may be operated by an electric motor within the assembly. In many examples, the choke actuator assembly 104 will also include provisions to enable manual operation, such as through use of a wrench or control wheel, to facilitate manual movement of the internal valve actuation assembly. In many examples, choke actuator assembly 104 will be threadably coupled to valve assembly 102, such as through use of a bonnet nut 106 coupling the two housing assemblies 108 and 114. In the depicted example, choke actuator assembly 104 includes a connector 120 to facilitate communication with a position sensor (not depicted) within the choke actuator assembly 104 to identify the position of the identified internal valve actuation assembly.

Figure 2A:
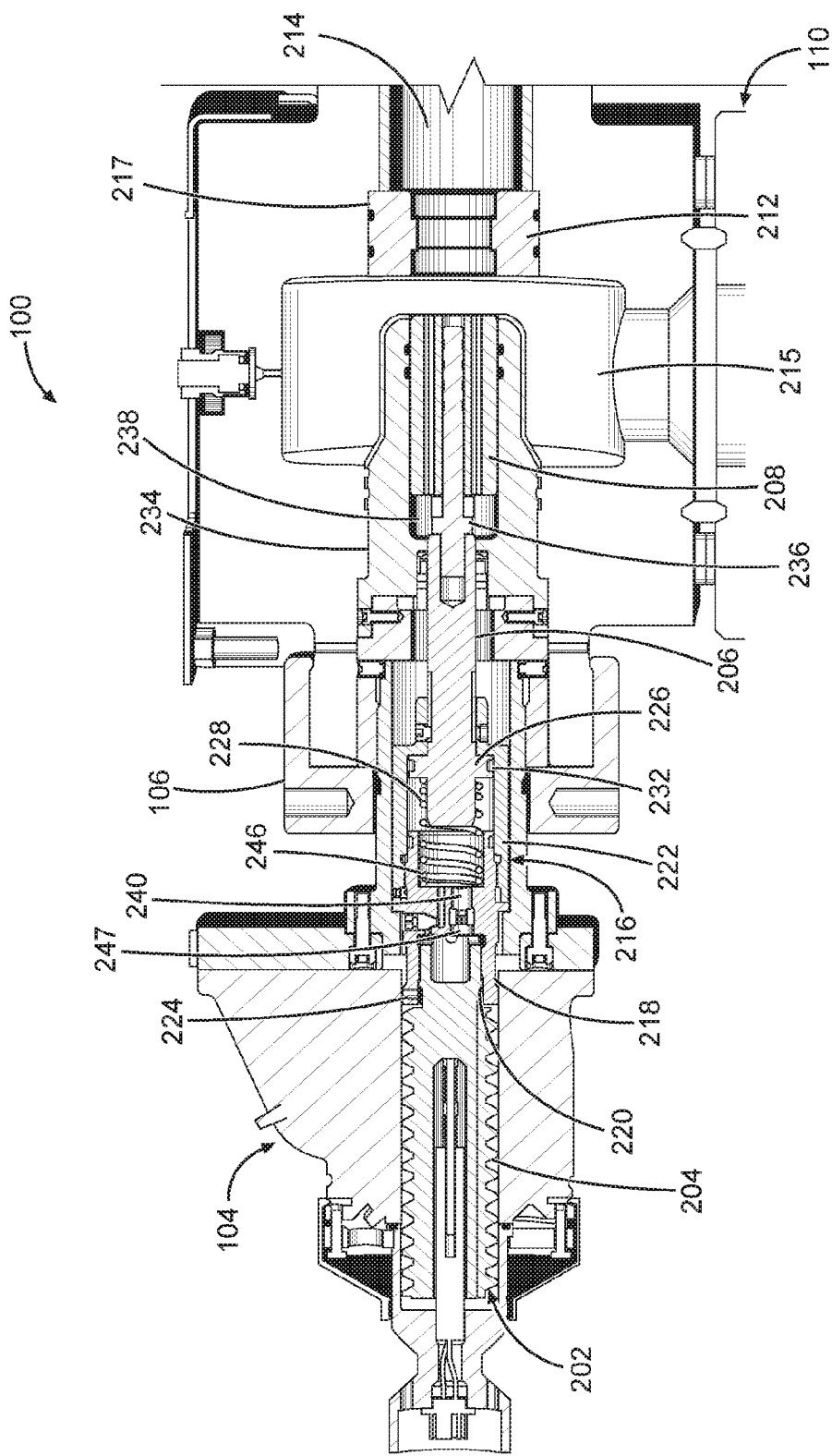
FIGS. 2A-B are each side views, partially in vertical section, of the well choke of FIG. 1; with FIG. 2A depicting the well choke in a fully open position; and with FIG. 2B depicting the well choke in a fully closed position.
Figure 2B:
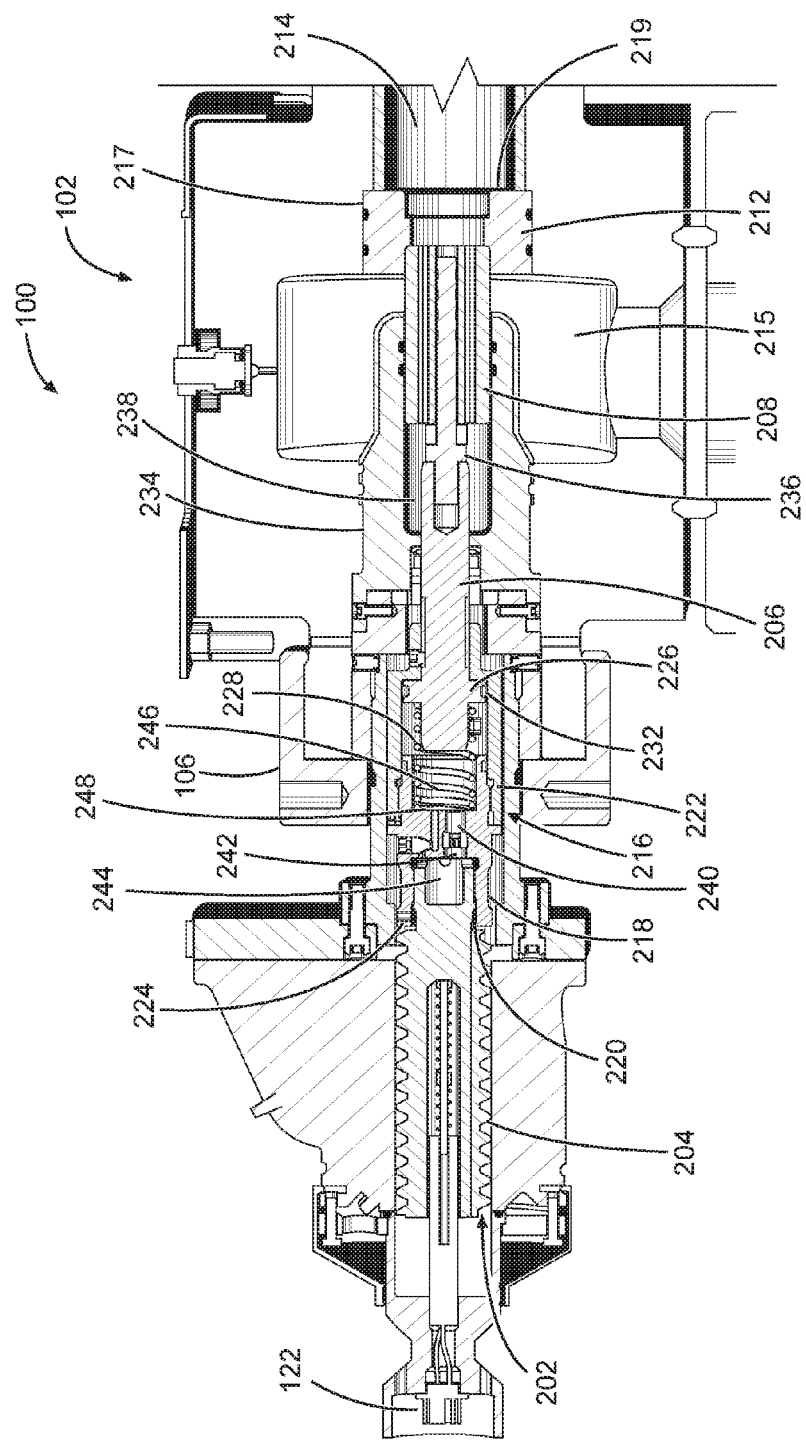
Figure 3:
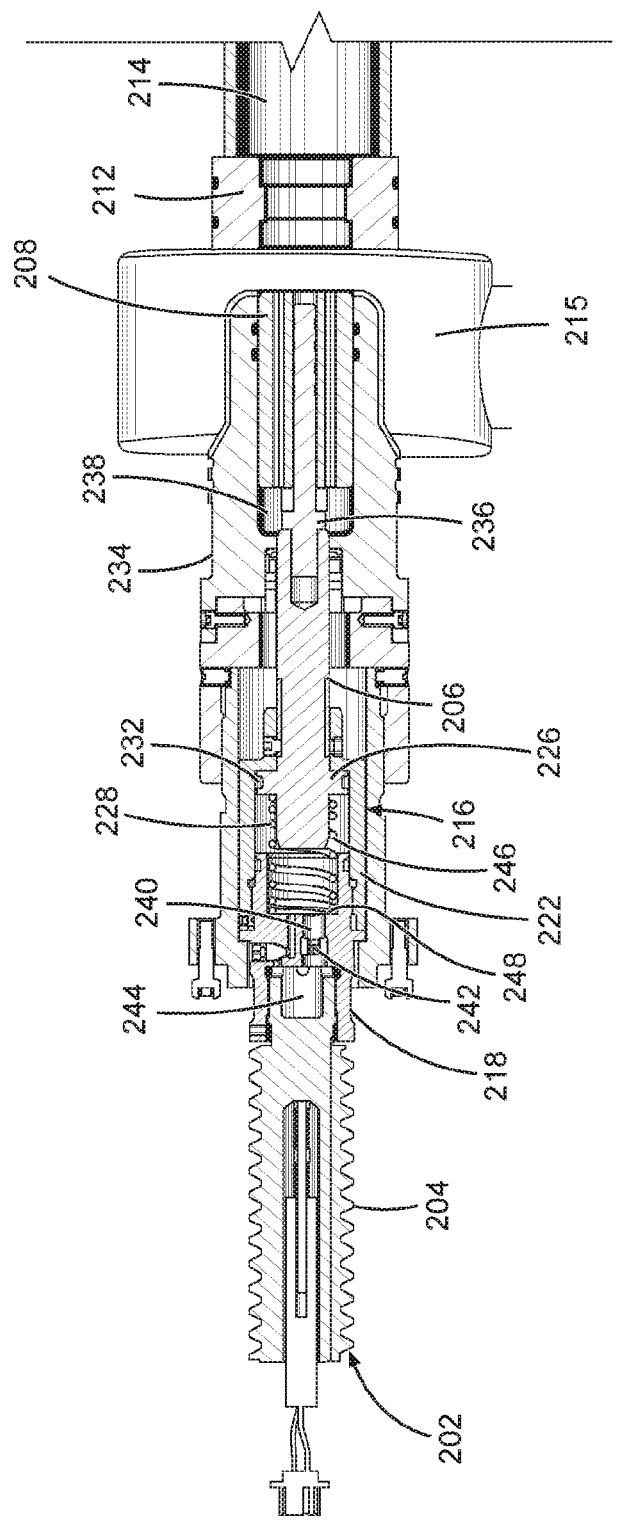
FIG. 3 is an enlarged side view depiction, partially in vertical section, of the internal valve actuation assembly of the well choke of FIGS. 1 and 2, illustrated with only immediately surrounding components for greater clarity.

Referring now to FIGS. 2A-B and 3, FIGS. 2A-B depict well choke assembly 100 from a side view, and partially in vertical section; with FIG. 2A depicting the well choke assembly 100 in a fully open position; and with FIG. 2B depicting the well choke assembly 100 in a fully closed position; and FIG. 3 depicts the valve actuation mechanism 202 of FIGS. 2A-B with only the directly surrounding components, for greater clarity. Referring first to FIG. 2A, as can be seen from the cross section, well choke assembly 100 includes an internal valve actuation mechanism, indicated generally at 202, extending as a generally linear assembly starting at actuation screw 204 within choke actuator assembly 104 and terminating at a valve member 208 housed within valve assembly 102. Valve member 208 has a distal end configured to engage complementary surfaces of a valve seat 212 which is in fluid communication, through a valve outlet conduit 214, to a fluid coupling for connection to associated fluid conduits (not illustrated, see element 112 in FIG. 1). Valve seat 212 is seated in a complimentary recess 217 in valve housing assembly 108. In many examples, valve seat 212 includes a shoulder 219 exposed to fluids within valve outlet conduit 214, which can cause valve seat 212 to be moveable away from engagement within recess 217 in response to fluid back pressures within valve outlet conduit 214. Valve assembly 102 also includes a fluid inlet conduit 215, in fluid communication with inlet fluid coupling 110 and with an inlet side of valve seat 212.

Valve actuation assembly 202 includes a linearly moveable drive mechanism, which in the depicted example is in the form of an actuation screw 204. In the depicted embodiment, movement of actuation screw 204 is controlled by operation of a hydraulic motor (see 122 in FIG. 1). Actuation screw 204 is coupled to a fluid coupling assembly, indicated generally at 216, which provides a coupling between actuation screw 204 and a generally proximal portion of operator stem 206. As can be seen in FIG. 2A, valve member 208 is retained within a support nose, indicated generally at 234. Support nose 234 contains an internal bore 238 configured to accommodate a distal portion of operator stem 206. While operator stem 206 may in some embodiments be configured to couple directly to valve member 208, in the depicted example, connection rod 236 is used to couple valve member 208 to operator stem 206 for translational movement therewith.

In the depicted example, fluid coupling assembly 216 defines a fluid chamber 228, and proximal portion of operator stem 206 includes a piston flange 226 configured to sealingly engage the sidewalls of fluid chamber 228 through one or more O-rings, or other seals, 232 to form a piston within the fluid chamber 228. As a result, when fluid chamber 228 is filled to maximum capacity with a generally incompressible fluid, piston flange 226, along with the remainder of operator stem 206, is biased to a first maximally spaced dimension relative to actuation screw 204. As will be apparent from the above description, because piston flange 226 sealing engages the surrounding bore, piston flange 226 defines the distal dimension of the fluid chamber. In the depicted example, fluid chamber 228 of fluid coupling assembly 216 is cooperatively formed by a coupling nut 218 secured by a threaded coupling 220 and one or more set screws 224 to a distal portion of actuation screw 204, and a chamber cap 222 is sealingly and threadably coupled to coupling nut 218, and contains an internal bore to define fluid chamber 228 surrounding piston flange 226.

Fluid chamber 228 is defined in part by a valve chamber 240 housing a pressure-responsive fluid valve, responsive to fluid pressure within fluid chamber 228. Pressure-responsive fluid valve can be of many possible configurations, including pressure-specific check valves and the like. However, for many applications, the pressures within fluid chamber 228 during normal operating conditions may be significant, for example between 10,000 to 14,000 psi, with values of 12,000 psi being common. A desirable mechanism for reliable operation at such pressures is a burst disc, including a frangible member sized and configured to burst at a predetermined threshold pressure to allow fluid flow there through once the threshold pressure is achieved. Accordingly, fluid coupling 216 utilizes a burst disc 242 in valve chamber 240 to define a portion of fluid chamber 228.

In some embodiments, it will be desirable to impart an initial biasing force on operator stem 206 to position piston flange 226 in a spaced relation away from actuation screw 204 to facilitate assembly of the fluid coupling 216. In the depicted example, this is achieved by placing a compressed biasing spring 246 between piston flange 226 and a support shoulder 248 on coupling nut 218, generally proximate actuation screw 204.

As noted above, FIG. 2A depicts well choke assembly 100 in a fully open position, in which the valve member 208 is retained in a relatively withdrawn position relative to support nose 234, and therefore away from engagement with the valve seat 212. In this position, fluid flow is permitted between valve inlet 215 and valve outlet 214. As can be seen by comparison to FIG. 2B, translational movement of actuation screw 204 in the direction of the valve seat 212 causes fluid coupling 216, operator stem 206, connection rod 236 and valve member 208 to move toward valve seat 212, to (in the depicted example) fully engage valve seat 212 and thereby prevent fluid flow between valve inlet 215 and valve outlet 214. In this normal operating condition, valve member 208 extends longitudinally beyond the distal portion of support nose 234. Under normal operating conditions, the spatial relationships between actuation screw 204 and valve member 208 will remain constant, and valve member 208 will translate relative to valve seat 212 to relatively open or dose the passageway through the valve assembly 102 in response to actuation of actuation screw 204 through hydraulic motor 122.

Figure 4:
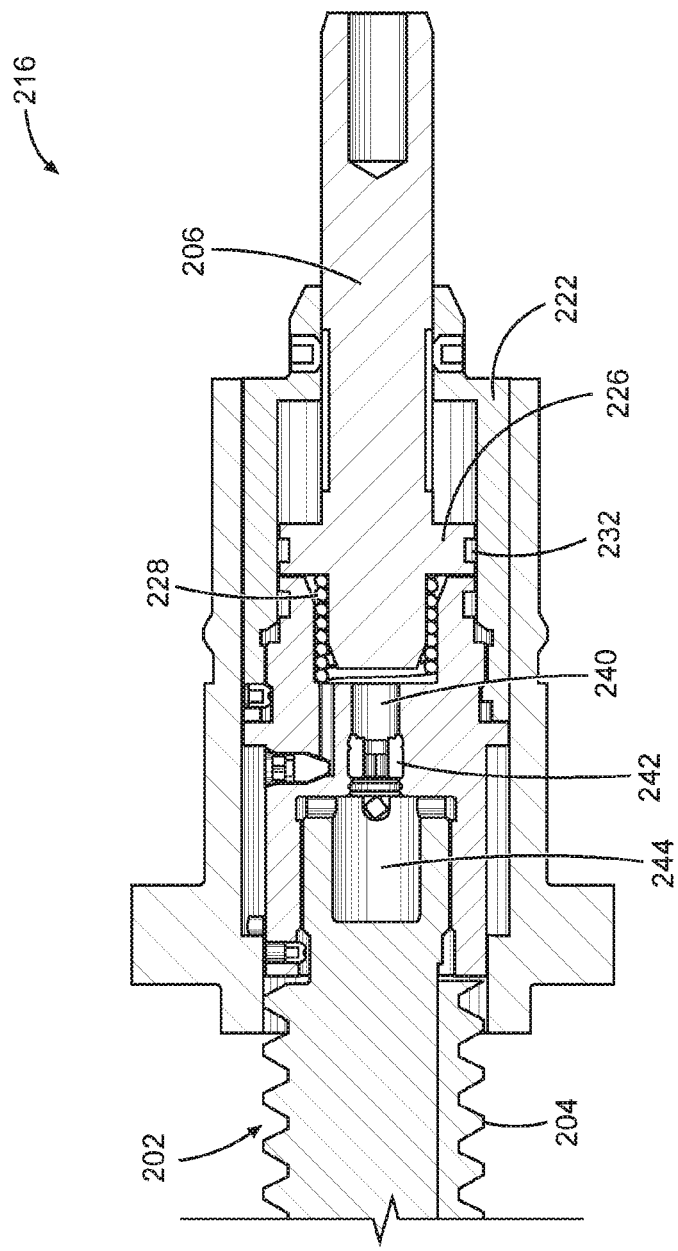
FIG. 4 is an enlarged side view depiction, partially in vertical section, of the fluid coupling assembly of the well choke of FIGS. 1-3, illustrated in an actuated position.
Figure 5:
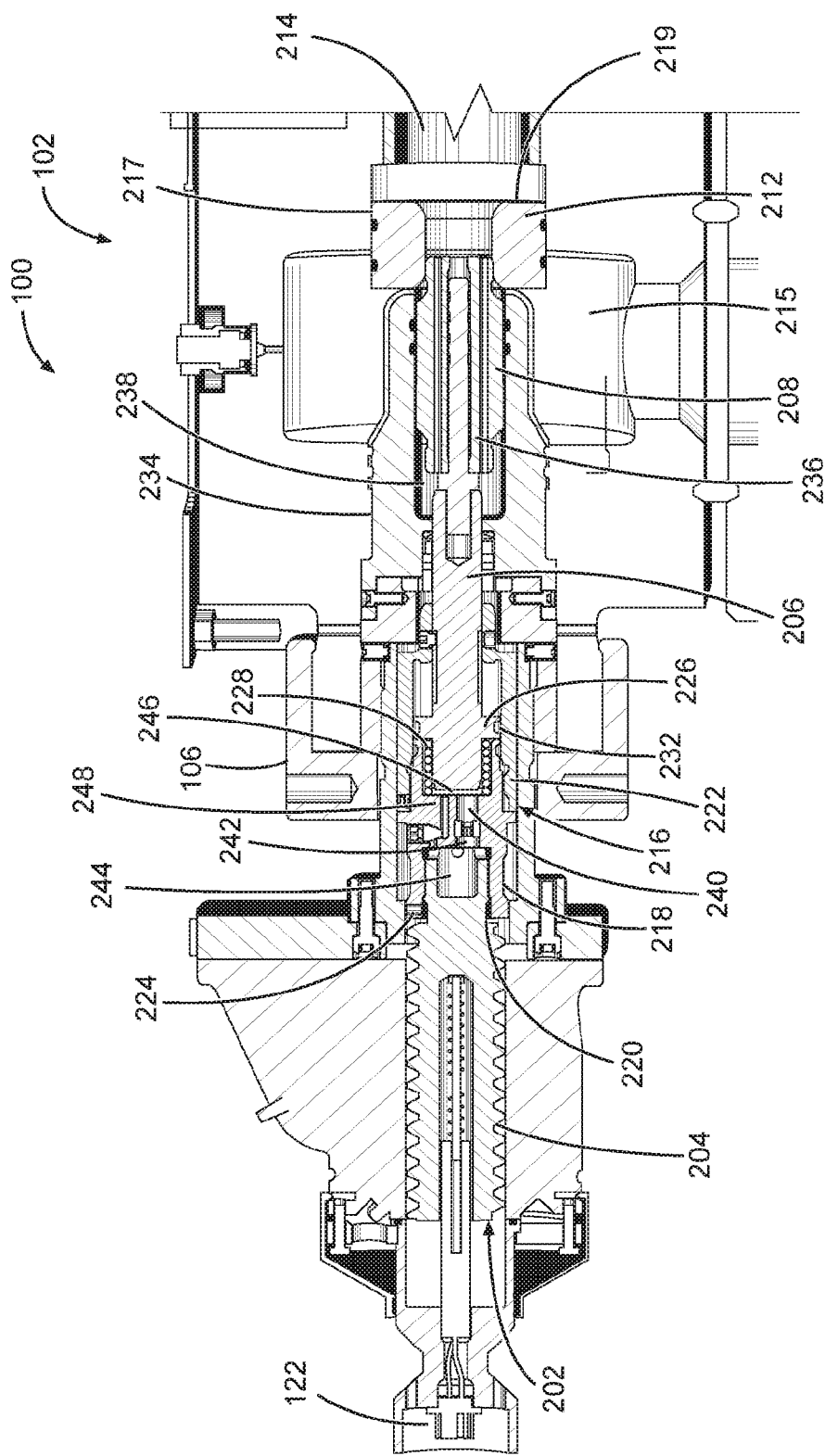
FIG. 5 is a side view depiction, partially in vertical section, of the well choke of FIGS. 1-4, after actuation of the fluid coupling assembly depicted in FIG. 4.

Referring now also to FIGS. 4 and 5, FIG. 4 depicts fluid coupling 216 in greater detail, and in a released state relative to the normal operating state depicted in FIGS. 2A-B and 3; and FIG. 5 depicts the well choke in an example state resulting from the released state of fluid coupling 216. During use of well choke assembly 100, it is possible the pressures may be encountered within well choke assembly 100 that could present a risk of catastrophic failure to the choke assembly or other components associated therewith. For that reason, the described fluid coupling 216 provides a safety release mechanism operable in response to undesirably high forces acting upon valve member 208 to allow valve member 208 to retract relative to support nose 234 to remove undesirable forces from loading the components in valve actuation assembly 202.

As discussed above, there is a rigid mechanical coupling between operator stem 206 and valve member 208 through connection rod 236. However, the coupling between actuation screw 204 and operator stem 206 is through a retained fluid column within the fluid chamber 228. As a result, forces exerted on valve member 208 translate through the identified components to fluid within fluid chamber 228. So long as the pressure within fluid chamber 228 remains at levels below a determined threshold, the operation of well choke assembly 100 continues as described above. As will be apparent from the discussion above, during normal operation, all forces exerted on valve member 208 are supported by the valve actuation mechanism 202.

In some circumstances, (such as, for example, when valve member 208 fully engages the valve seat 212, and the choke is closed), downstream pressures may act on both valve member 208 and valve seat 212. In many examples, by virtue of inwardly extending shoulder 219, valve seat 212 will be designed to move away from its seated position in recess 217 and toward support nose 234 in response to such downstream pressures. Such movement will be prevented, however, by valve actuation mechanism 202 if valve member 208 is fully engaged with valve seat 212. However, at some point, it will be beneficial to relieve that loading on the valve actuation mechanism 202.

As a result, if the forces on valve member 208 and/or valve seat 212 rise to a threshold level, such that pressure within fluid chamber 228 exceeds a threshold pressure, as established by the burst pressure of burst disc 242, the disc will burst. Bursting of burst disc 242 releases fluid from fluid chamber 228 into a reservoir region 244, and causes piston flange 226 to retract in response to the exerted forces, moving it toward actuation screw 204. This has the effect of decreasing the total length of valve actuation mechanism 202 and thereby decreasing the distance there between, thereby allowing valve member 208 to withdraw back within support nose 234. This will allow valve seat 212 to move away from its normally seated position, and to a position where it is supported by support nose 234, thereby further relieving loading on valve actuation mechanism 202, and thereby preventing failure thereof. As depicted in FIG. 5, in many example devices, the spacing between support nose 234 and valve seat 212 is such that even if valve seat 212 moves away from its fully seated position within recess 217, it will not have room to move completely out of recess 217.

In assembling the well choke assembly 100 as discussed above, different approaches of providing a releasable fluid coupling can be envisioned. Although not limited to the assembling of structures as shown in FIGS. 1-4, for clarity of understanding of the described method of assembly, reference is made to structures in such Figures. In accordance with the above description, the present disclosure contemplates the assembly of the well choke assembly (100) to include coupling a linearly moveable drive mechanism, such as, for example actuation screw 204, to a valve member drive piston (which in the above-described embodiment is formed as a portion of operator stem 206), by placing a portion of the drive piston (piston flange 226) within the fluid chamber 228, and coupling the fluid chamber 228 to the linearly movable drive mechanism (actuation screw 204). As described above, the fluid chamber 228 will be constructed by providing a pressure responsive valve mechanism in fluid communication with the chamber such that it forms a part thereof. Once the fluid chamber (228) is defined, it can be filled with a generally incompressible fluid. This fluid may be of almost any desired type, ranging from water to various forms of hydraulic fluids. In many examples, the fluid chamber will be defined such that the retained fluid column therein urges the drive piston (piston flange 226) away from the linearly movable drive mechanism (actuation screw 204), and in many such examples the retained fluid column will urge the drive piston to a maximum possible spacing relative to the linearly movable drive mechanism. A valve member (208) will be coupled, either directly or indirectly to the drive piston. As a result, so long as the fluid chamber 228 remains filled with fluid, linear movement of the linear movable drive mechanism (actuation screw 204) will be communicated through the retained fluid column to the valve member.

As will be apparent to persons skilled in the art, many variations may be made relative to the described configuration, For example, the longitudinal dimension of the fluid chamber may be adjusted by changing the dimensions of chamber cap 222, thereby facilitating different dimensions of the reduction in length of valve actuation mechanism 202 in response to over-pressure situations.

According to aspects of the present disclosure, a well fluid flow control device may include a valve seat, a valve closure member, and an actuation mechanism coupled to the valve closure member and operable to move the valve closure member relative to the valve seat to control flow of fluid through the device. In many example systems, a pressure-responsive fluid valve in communication with the fluid-filled chamber will be actuable to release fluid from the chamber when the fluid pressure in the chamber reaches a threshold level. In some embodiments, the actuation mechanism may include a pressure-actuated relief mechanism; which in some case can be in the form of a burst valve.

In some aspects of the present disclosure, the actuation mechanism may include first and second members cooperatively defining opposing surfaces of a fluid chamber such that fluid substantially filling the chamber maintains the first and second members in a first, spaced, relation to one another. In some embodiments, the first member is a driven member, and the second member is coupled to the valve closure mechanism. In some embodiments, the actuation mechanism may include a linearly moveable drive mechanism; which in some embodiments will include an actuation screw.

Also according to aspects of the present disclosure, a well choke assembly may include a choke inlet, a choke outlet, with a valve seat in a flow path extending between the choke inlet and choke outlet. Some embodiments may include a valve member linearly moveable relative to the valve seat, and an actuation assembly operatively coupled to linearly move the valve member relative to the valve seat. In some embodiments, the actuation mechanism may include two members coupled in spaced relation at a first distance by a retained fluid column between the two members. The well choke assembly will include a relief valve to release at least a portion the retained fluid once pressure of the retained fluid reaches a threshold level; whereby release of the retained fluid causes the distance of spaced relation between the two members to reduce to a second distance less than the first distance, which can, in some embodiments, reduce the length of the actuation assembly. In some embodiments, the relief valve may include a burst disk, which can be configured to rupture in response to fluid pressure in the retained fluid column at the threshold level.

Also according to aspects of the present disclosure, a method of assembling a well choke may include coupling a valve member in moveable relative to a valve seat, to regulate fluid flow through a flow passage defined in part by the valve seat, performed by steps including: (i) coupling the linearly moveable drive mechanism to the valve member drive piston through a fluid coupling by placing a portion of the drive piston within a fluid chamber, and coupling the fluid chamber to the linearly moveable drive mechanism; (ii) filling the fluid chamber with a generally incompressible fluid to form a fluid column maintaining the drive piston spaced at a first distance from the linearly moveable drive mechanism; and NO coupling the valve member drive piston to the valve member such that linear movement of the linearly moveable drive mechanism will be communicated through the fluid column to the valve member. In some embodiments, the coupling a valve member in moveable relative to a valve seat, to regulate fluid flow through a flow passage defined in part by the valve seat may include providing a linearly moveable drive mechanism and a valve member drive piston. In some embodiments, such a method of assembling a well choke may further include biasing the drive piston in a direction opposite the linearly movable drive mechanism to space it at the first distance from the linearly movable drive mechanism.

Also according to aspects of the present disclosure, a method of assembling a well choke may include assembling a telescoping valve member drive mechanism within a housing assembly; filling the fluid chamber with an essentially non-compressible fluid to bias the drive assembly piston toward a first end of the fluid chamber; and installing a pressure responsive relief valve in fluid communication with the fluid chamber, the relief valve configured to open the fluid chamber in response to pressure in the fluid chamber reaching a threshold level.

In some embodiments, the telescoping valve member drive mechanism may include a fluid chamber through which an actuation screw is fluidically coupled to a valve element, the valve element configured to selectively engage a valve seat supported within the housing assembly. In some embodiments, the valve element is coupled to a drive assembly that may include a piston located within the fluid chamber. In some embodiments, the pressure responsive relief valve may include a burst disk. In some embodiments, such a method of assembling a well choke may further include installing a biasing mechanism to bias the drive assembly piston toward the first end of the fluid chamber. In some embodiments, the valve element drive assembly is arranged to communicate pressure applied on the valve element to the fluid within the fluid chamber.

In the foregoing Detailed Description, it can be seen that various features are grouped together in a single embodiment for the purpose of streamlining the disclosure. This method of disclosure is not to be interpreted as indicating that all embodiments of the disclosed subject matter necessarily require all or even combination of all or some of such features.

I claim:

1. A well fluid flow control device, comprising:
a valve housing assembly including a valve seat;
a valve closure member at least partially within the valve housing assembly and selectively moveable relative to the valve seat; and
an actuation mechanism coupled to the valve closure member and operable to move the valve closure member relative to the valve seat to control flow of fluid through the device, the actuation mechanism comprising a pressure-actuated relief mechanism, comprising,
first and second members cooperatively defining opposing surfaces of a fluid chamber such that fluid substantially filling the chamber maintains the first and second members in a first, spaced, relation to one another; and
a pressure-responsive fluid valve in communication with the fluid-filled chamber to release fluid from the chamber when the fluid pressure in the chamber reaches a threshold pressure.

2. The well fluid flow control device of claim 1, wherein the first member is a driven member, and wherein the second member is coupled to the valve closure mechanism.

3. The well fluid flow control device of claim 1, wherein the actuation mechanism comprises a linearly movable drive mechanism.

4. The well fluid flow control device of claim 1, wherein the linearly movable drive mechanism comprises an actuation screw.

5. The well fluid flow control device of claim 1, wherein the pressure-responsive fluid valve comprises a burst disk, and wherein the burst disk is configured to rupture at the threshold pressure.

6. The well fluid flow control device of claim 1, wherein the second member is a portion of a valve member drive assembly.

7. A well choke assembly, comprising,
a housing assembly defining a flow path extending between a choke inlet and a choke outlet;
a valve seat in the flow path;
a valve member linearly moveable relative to the valve seat; and
an actuation assembly operatively coupled to linearly move the valve member relative to the valve seat, the actuation mechanism including two members coupled in spaced relation at a first distance by a retained fluid column between the two members, and further including a relief valve to release at least a portion the retained fluid column once pressure of the retained fluid reaches a threshold level.

8. The well choke assembly of claim 7, wherein release of the retained fluid causes the distance of spaced relation between the two members of the actuation mechanism to reduce to a second distance lesser than the first distance.

9. The well choke assembly of claim 8, wherein the reduction of the distance of spaced relation between the two members to the second distance reduces the length of the actuation assembly.

10. The well choke assembly of claim 7, wherein the pressure on the retained fluid column is responsive to the pressure on the valve member within the flow path.

11. The well choke assembly of claim 7, wherein the relief valve comprises a burst disk, and wherein the burst disk is configured to rupture in response to fluid pressure in the retained fluid column at the threshold level.

12. The well choke assembly of claim 7, wherein the actuation assembly comprises:
an actuator housing assembly;
an actuation screw within the actuator housing assembly; and
a fluid coupling assembly coupled to the actuation screw; and
wherein the fluid coupling assembly comprises,
a housing assembly defining a fluid piston chamber, in which a first end of the fluid piston chamber includes the first member, and a piston within the fluid piston chamber, in which the piston includes the second member and further forms a part of an operator stem, and wherein the restrained fluid column is located within the piston chamber between the first and second members; and wherein the valve member is coupled to the operator stem.

13. The well choke assembly of claim 12, further comprising a biasing mechanism oriented to bias the first and second members away from one another to spaced relation at the first distance.

14. A method of assembling a well choke, comprising:
coupling a valve member in moveable relative to a valve seat supported by a valve housing assembly, the valve member to regulate fluid flow through a flow passage defined in part by the valve seat, performed by steps comprising,
providing a linearly moveable drive mechanism and a valve member drive piston;
coupling the linearly moveable drive mechanism to the valve member drive piston through a fluid coupling by placing a portion of the drive piston within a fluid chamber, and coupling the fluid chamber to the linearly moveable drive mechanism, wherein the fluid chamber is defined in part by a pressure-responsive valve mechanism, responsive to pressure within the fluid chamber; and
filling the fluid chamber with a generally incompressible fluid to form a fluid column maintaining the drive piston spaced at a first distance from the linearly moveable drive mechanism; and
coupling the valve member drive piston to the valve member such that linear movement of the linearly moveable drive mechanism will be communicated through the fluid column to the valve member.

15. The method of assembling a well choke of claim 14, further comprising biasing the drive piston in a direction opposite the linearly movable drive mechanism to space it at the first distance from the linearly movable drive mechanism.

16. The method of assembling a well choke of claim 14, wherein the pressure responsive valve mechanism comprises a burst disk.

17. A method of assembling a well choke, comprising:
assembling a telescoping valve member drive mechanism within a housing assembly, the telescoping valve member drive mechanism comprising a fluid chamber through which an actuation screw is fluidically coupled to a valve element, the valve element configured to selectively engage a valve seat supported within the housing assembly, wherein the valve element is coupled to a drive assembly that includes a piston located within the fluid chamber;
filling the fluid chamber with an essentially non-compressible fluid to bias the drive assembly piston toward a first end of the fluid chamber; and
installing a pressure responsive relief valve in fluid communication with the fluid chamber, the relief valve configured to open the fluid chamber in response to pressure in the fluid chamber reaching a threshold level.

18. The method of assembling a well choke of claim 17, wherein the pressure responsive relief valve comprises a burst disk.

19. The method of assembling a well choke of claim 17, further comprising installing a biasing mechanism to bias the drive assembly piston toward the first end of the fluid chamber.

20. The method of assembling a well choke of claim 17, wherein the valve element drive assembly is arranged to communicate pressure applied on the valve element to the fluid within the fluid chamber.

* * * * *